US007035940B2

United States Patent
Sahasrabudhe et al.

(10) Patent No.: US 7,035,940 B2
(45) Date of Patent: Apr. 25, 2006

(54) SYSTEM AND METHOD FOR MOBILE ROUTER COST METRIC UPDATES FOR ROUTING PROTOCOLS

(75) Inventors: Meghana Sahasrabudhe, San Jose, CA (US); Jari T. Malinen, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 153 days.

(21) Appl. No.: 10/290,031

(22) Filed: Nov. 7, 2002

(65) Prior Publication Data

US 2004/0093426 A1 May 13, 2004

(51) Int. Cl.
G06F 15/173 (2006.01)
(52) U.S. Cl. .................................. 709/242; 709/245
(58) Field of Classification Search ............... 709/238, 709/230; 370/338
See application file for complete search history.

(56) References Cited

U.S. PATENT DOCUMENTS

| | | | | |
|---|---|---|---|---|
| 5,533,026 A * | 7/1996 | Ahmadi et al. | ............. | 370/349 |
| 5,754,790 A | 5/1998 | France et al. | | |
| 6,421,731 B1 * | 7/2002 | Ciotti et al. | ................ | 709/238 |
| 6,636,498 B1 * | 10/2003 | Leung | ......................... | 370/338 |
| 6,701,361 B1 * | 3/2004 | Meier | .......................... | 709/224 |
| 2001/0033556 A1 * | 10/2001 | Krishnamurthy et al. | ... | 370/329 |
| 2002/0046287 A1 * | 4/2002 | La Porta | ..................... | 709/230 |
| 2002/0069278 A1 * | 6/2002 | Forslow | ....................... | 709/225 |
| 2002/0080752 A1 * | 6/2002 | Johansson et al. | .......... | 370/338 |
| 2002/0086674 A1 * | 7/2002 | Jung | .......................... | 455/436 |
| 2002/0118663 A1 * | 8/2002 | Dorenbosch et al. | ....... | 370/338 |
| 2002/0181401 A1 * | 12/2002 | Higirahim et al. | .......... | 370/236 |
| 2003/0125027 A1 * | 7/2003 | Gwon et al. | ................. | 455/436 |
| 2004/0078485 A1 * | 4/2004 | Narayanan | ................... | 709/242 |

* cited by examiner

*Primary Examiner*—Zarni Maung
*Assistant Examiner*—Karen Tang
(74) *Attorney, Agent, or Firm*—Jamie L. Wiegand; Darby & Darby PC

(57) ABSTRACT

A system and method is directed to updating information in a mobile network. A dynamic signaling routing protocol is extended over bi-directional tunneling between a mobile router and its home agent such that information associated with the home agent of the mobile router reflects roaming of the mobile router as it travels from its home network. The information is determined as a function of a characteristic associated with each link of the tunnel between the mobile router and its home agent. In one embodiment, the information includes a cost metric associated with the cost of the tunnel. The information is advertised to another router. The other router employs the information associated with the tunnel to determine a path for communication.

43 Claims, 4 Drawing Sheets

SYSTEM AND METHOD FOR MOBILE ROUTER COST METRIC UPDATES FOR ROUTING PROTOCOLS

FIELD OF THE INVENTION

The present invention relates to network routing, and more particularly to a system and method for updating information in a mobile network.

BACKGROUND OF THE INVENTION

Mobile computing is becoming increasingly common. Over the years, the impact of mobile computing on the way we live and do business has been surpassed, perhaps, only by the impact of the Internet. Mobile nodes, such as data-ready cellular phones, pagers, laptop computers, and wireless personal digital assistants (PDAs) have become so commonplace in our lives that it easy to forget that such technology was rare only a few years ago.

A mobile node is able to change its point of attachment from one network or subnet to another as it roams from its home network. The mobile node travels from link to link, maintaining ongoing communications by updating its care-of-address at each new link.

Recently, it has become popular to relocate entire networks away from their home network. Mobile routers enable entire networks to roam. For example, an airplane, car, train, or ship can travel around the world, while passengers stay connected to the Internet. Traditionally, such communication is accomplished by Mobile Internet Protocol (IP) aware routers, which route packets destined to hosts on the mobile network, to a location where the mobile router is visiting.

Mobile routers eliminate the need for a host to be aware of mobility. In fact, local nodes on the mobile network may not be aware of any IP mobility at all, thereby eliminating updating of the node's care-of-address as the network roams. The mobile router hides the IP roaming from its local nodes within the mobile network, so that the local nodes appear to be directly attached to their home network.

However, while mobile routing provides advantages in mobile IP, it is not without problems. The mobile router must update its care of address as the mobile network attaches to visiting networks. Moreover, such movement of mobile networks has severe impacts on underlying routing protocols employed by traditional routers. Thus, it is with respect to these considerations and others that the present invention has been made.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to a method for updating information in a mobile network. The method determines at least one characteristic for each link in a tunnel between a router and a mobile router. The method also determines information associated with the tunnel. The information is a function of at least one characteristic for a link associated with the tunnel. The information is advertised to another router, thereby enabling the other router to employ the information associated with the tunnel to determine a path for communication. In one embodiment of the method, determining the information includes exchanging a signal between the router and the mobile router through the tunnel, modifying the information as the signal traverses the tunnel. The information is included in the signal.

Another aspect of the invention is directed to an apparatus for updating information in a mobile network. The apparatus includes a network interface, and a router. The network interface employs a packet-based protocol to send and receive packets through a tunnel. The router is configured for advertising the information associated with the tunnel. The router determines at least one characteristic for each link in a tunnel between the router and a mobile router. The router also determines information associated with the tunnel. The information is a function of at least one characteristic for a link associated with the tunnel. The information is advertised by the router to another router, where the advertised information enables the other router to employ the information associated with the tunnel to determine a path for communication.

Still another aspect of the invention is directed to a system for updating information in a mobile network. The system includes a mobile router, a tunnel, and a router. The mobile router is configured to move to a foreign network. The tunnel is coupled at one end to the mobile router. The tunnel comprises at least one link. The router is coupled to an other end of the tunnel. The router determines at least one characteristic for each link in the tunnel between the router and the mobile router. The router also determines information associated with the tunnel. The information is a function of at least one characteristic for a link associated with the tunnel. Information is advertised by the router to another router, to enable the other router to employ the information associated with the tunnel to determine a path for communication.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "signal" means at least one current signal, voltage signal, data signal, or packet signal. The term "flow" refers to a flow of packets. The meaning of "a," "an," and "the" include plural references. The meaning of "in" includes "in" and "on."

Additionally, a reference to the singular includes a reference to the plural unless otherwise stated or is inconsistent with the disclosure herein.

Briefly stated, the present invention is directed to updating information in a mobile network. A dynamic signaling routing protocol is extended over a bi-directional tunnel between a mobile router and its home agent such that information associated with the home agent of the mobile router reflects roaming of the mobile router as it travels from its home network. The information is determined as a function of a characteristic associated with each link of the tunnel between the mobile router and its home agent. In one embodiment, the information includes a cost metric associated with the cost of the tunnel. The information is advertised to another router, thereby enabling the other router to employ the information associated with the tunnel to determine a path for communication. Providing the information to reflect a more accurate cost of the tunnel if the mobile router is away from its home network enables the other router to determine a more optimal path. Moreover, providing the information may also reduce traffic though the tunnel from the mobile router to its home agent.

Illustrative Environment

Figure 1:
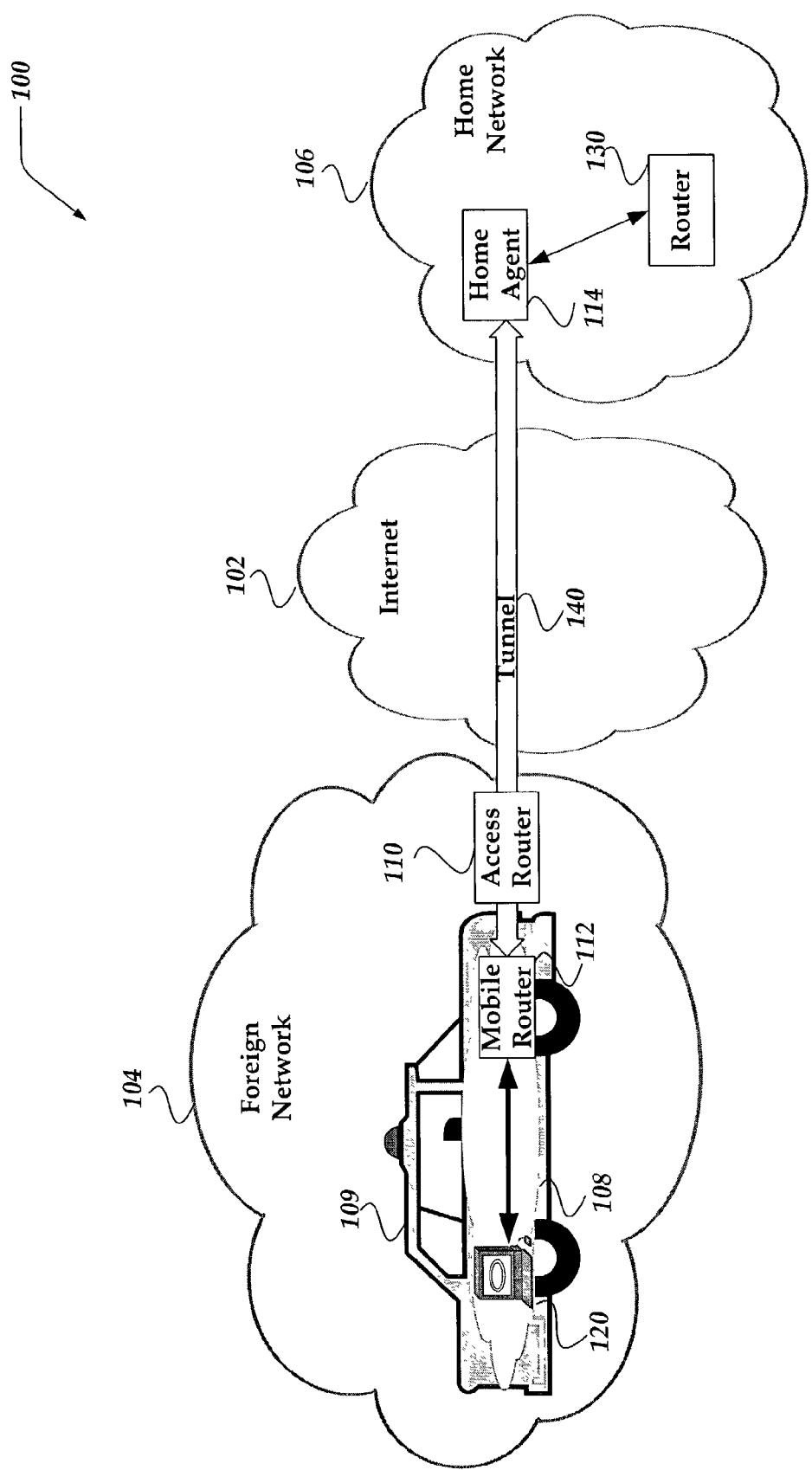
FIG. 1 illustrates a block diagram generally showing an overview of one embodiment for a mobile system.

FIG. 1 illustrates a block diagram generally showing an overview of one embodiment for a mobile system in which the present invention may operate. As shown in the figure, mobile system 100 includes Internet 102, foreign network 104, and home network 106. Internet 102 includes tunnel 140. Foreign network 104 includes access router 110 and mobile network 108. Mobile network 108 includes mobile router 112 and local node 120. For example purposes, mobile network 108 is shown in motor vehicle 109. Although not shown, mobile network 108 may be located in different types of mobile platforms, including boats, motorcycles, airplanes, bicycles, trains, and the like.

Home network 106 includes home agent 114 and router 130. Mobile system 100 may include many more components than those shown in FIG. 1. However, the components shown are sufficient to disclose an illustrative embodiment for practicing the present invention.

As further shown in the figure, router 130 is in communication with home agent 114. Home agent 114 is in communication with mobile router 112 through tunnel 140. Mobile router 112 is in communication with access router 110 and local node 120.

Foreign network 104 and home network 106 are networks that can employ any form of computer readable media for communicating information from one electronic device to another. Foreign network 104 and home network 106 can include local area networks (LANs), wide area networks (WANs), direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other link known to those skilled in the art. Furthermore, remote computers and other related electronic devices can be remotely connected to either LANs or WANs via a modem and temporary telephone link.

The media used to transmit information in the links illustrates one type of computer-readable media, namely communication media. Generally, computer-readable media includes any media that can be accessed by a computing device. Communication media typical embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Moreover, home network 106 is a network that includes a network IP address prefix from which the mobile router 112's long-term home IP address is assigned. Foreign network 104 represents any network that is not the home network of mobile router 112, and in which mobile network 108 is visiting. Additionally, Internet 102 may be formed from a vast number of interconnected networks, computers, and routers, such as described above.

Generally, a router is an intermediary device on a communication network that expedites signal delivery. On a single network connecting many computers through a mesh of possible links, a router receives transmitted signals and forwards them to their correct destinations over available paths. A router typically operates at layer 3 TCP/IP of the Open Systems Interconnection (OSI) reference model for networking. However, some routers can provide additional functionality that operates above layer 3 of TCP/IP or OSI reference model. Additionally, routers may be a simple computing device or a complex computing device. For example, a router may be a computer including memory, processors, and network interface units.

Home agent 114 is a router in home network 106 that provides an anchoring point for mobile network 108. Home agent 114 is configured to maintain an association between a home IP address of mobile router 112 and its care-of-address, which is a current location of mobile router 112 in foreign network 104. Home agent 114 typically maintains track of where mobile router 112 roams and enables generation of tunnel 140 for tunneling signals to the current location of mobile router 112. Home agent 114 is also configured to inject information about mobile network 108 into routing tables and advertise such information to another router, such as router 130.

Access router 110 is a point of attachment to mobile router 112, and enables signaling between home agent 114 and mobile router 112.

Mobile network 108 represents a network, such as described above, that can connect to the Internet through the mobile router 112. Mobile network 108 is typically configured within a mobile platform such as an airplane, car, ship, train or the like such that mobile network 108 may roam.

However, mobile network 108 is not so limited. For example, mobile network 108 may include a set of links and multiple interconnected nodes and routers.

Local node 120 may include any device capable of connecting to a network, wired or wireless. Such devices include desktop computers, laptop computers, multiprocessor systems, microprocessor-based or programmable electronics, network PCs, and the like. Local node 120 may also include wireless devices such as cellular telephones, smart phones, pagers, radio frequency (RF) devices, infrared (IR) devices, integrated devices combining one or more of the preceding devices, and the like.

Mobile router 112 is described in more detail below in conjunction with FIG. 3. Briefly, however, mobile router 112 is a router that is enabled to support global connectivity to home network 106. Mobile router 112 can move from a link within home network 106 to a link in foreign network 104. An interface on mobile router 112 is configured to connect to a link within foreign network 104 such that mobile router 112 may forward and receive signals. Mobile router 112, and home agent 114, can support insertion of routing table entries for hosts and networks accessible to mobile router 112. Mobile router 112 typically performs a routing protocol to determine a path for communication. For example, mobile router 112 may employ routing protocols such as Routing Information Protocols (RIP), Interior Gateway Routing Protocol (IGRP), Open Shortest Path First Routing Protocol (OSPF), and Protocol Independent Multicast (PIM). Mobile router 112 also employs a mobility protocol that is extended over a bi-directional tunnel, such as tunnel 140, to home agent 114. The mobility protocol employed may be Mobile IP, or a session initiation protocol (SIP) modified with mobility extensions, or any other mechanism for communicating mobility signals.

Tunnel 140 represents secure links through Internet 140 between mobile router 112 and home agent 114. Tunnel 140 may employ any of a variety of mechanisms to encrypt signals between devices. Typically, tunnel 140 employs mechanisms that encapsulate a signal, such an IP datagram, within another signal for communication. Such mechanisms include, but are not limited to, Generic Routing Encapsulation (GRE), IPSec, Layer 2 Forwarding (L2F), Point-to-point Tunneling Protocol (PPTP), and Layer 2 Tunneling Protocol (L2TP).

Figure 2:
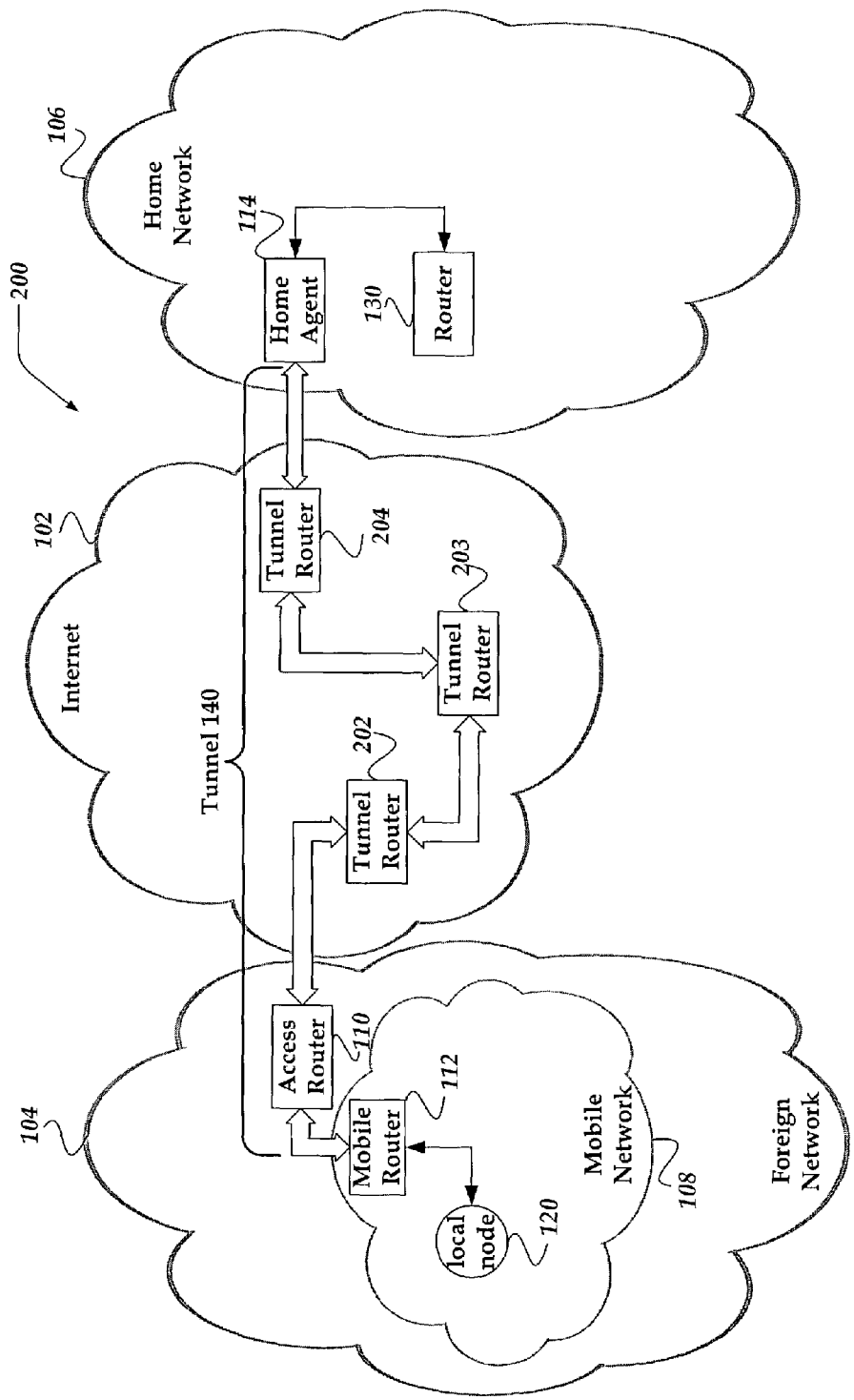
FIG. 2 illustrates a functional block diagram of one embodiment of a general architecture of the mobile system of FIG. 1.

Referring to FIG. 2, a functional block diagram of one embodiment of the mobile system of FIG. 1 shows an expanded view of tunnel 140. Tunnel 140 may include many more components than those shown in FIG. 2. However, as shown in the figure, tunnel 140 includes tunnel routers 202–204.

As illustrated in FIG. 2, mobile router 112 is in communication with access router 110 by way of a link at one end of tunnel 140. Access router 110 is in communication with tunnel 202 by way of another link. Tunnel router 202 is in communication with tunnel router 203 by way of still another link. Tunnel router 203 is also in communication with tunnel router 204 by way of yet another link. Tunnel router 204 is in communication with home agent 114 by way of still another link. The links through tunnel 140 may include fiber, twisted wire pair or coaxial cable, analog telephone lines, full or fractional dedicated digital lines including T1, T2, T3, and T4, Integrated Services Digital Networks (ISDNs), Digital Subscriber Lines (DSLs), satellite links, fiber, Asymmetric Digital Subscriber Lines (ADSL), Video Digital Subscriber Lines (VDSL), or any other linking mechanism known to those skilled in the art.

Tunnel routers 202–204 are routers enabled to perform tunneling between mobile router 112 and home agent 114. Tunnel 140 may include other routers in addition to those illustrated. For example, tunnel 140 may also include routers (not shown) within foreign network 104.

In traditional systems, tunnel 140 enables the path between home agent 114 and mobile router 112 to appear as a single link in home network 106. Thus, tunnel 140 hides mobile router 112's movement away from home network 106 such that router 130 is unaware that mobile router 112 may be multiple links away from home network 106. Router 130 believes that mobile router 112 is still in home network 106. Therefore, a cost associated with employing tunnel 140 to communicate may not change as mobile router 112 roams away from home network 106.

When mobile router 112, in traditional systems, communicates routing information to a neighboring router, such as router 130, the routing information may indicate that the cost associated with the tunnel has not changed. The neighboring router therefore believes that mobile router 112 is still in home network 106, and the cost associated with tunnel 140, is a cost associated with mobile router 112's home link. However, when mobile router 112 is away from home network 106, it is likely that the cost of tunnel 140 is higher than the cost of mobile router 112's home link. A neighboring router, such as router 130, may therefore employ tunnel 140 to communicate information, based on incorrect cost information associated with tunnel 140.

The present invention is directed to updating information associated with tunnel 140, as mobile router 112 roams away from home network 106. Updating information associated with tunnel 140, such as the cost of tunnel 140, enables another router to employ the information to better determine a path for communication. The other router may then elect to employ an alternate path to tunnel 140, to communicate. By providing changes in the information associated with tunnel 140 to other routers, traffic flow through tunnel 140 may be reduced.

Figure 3:
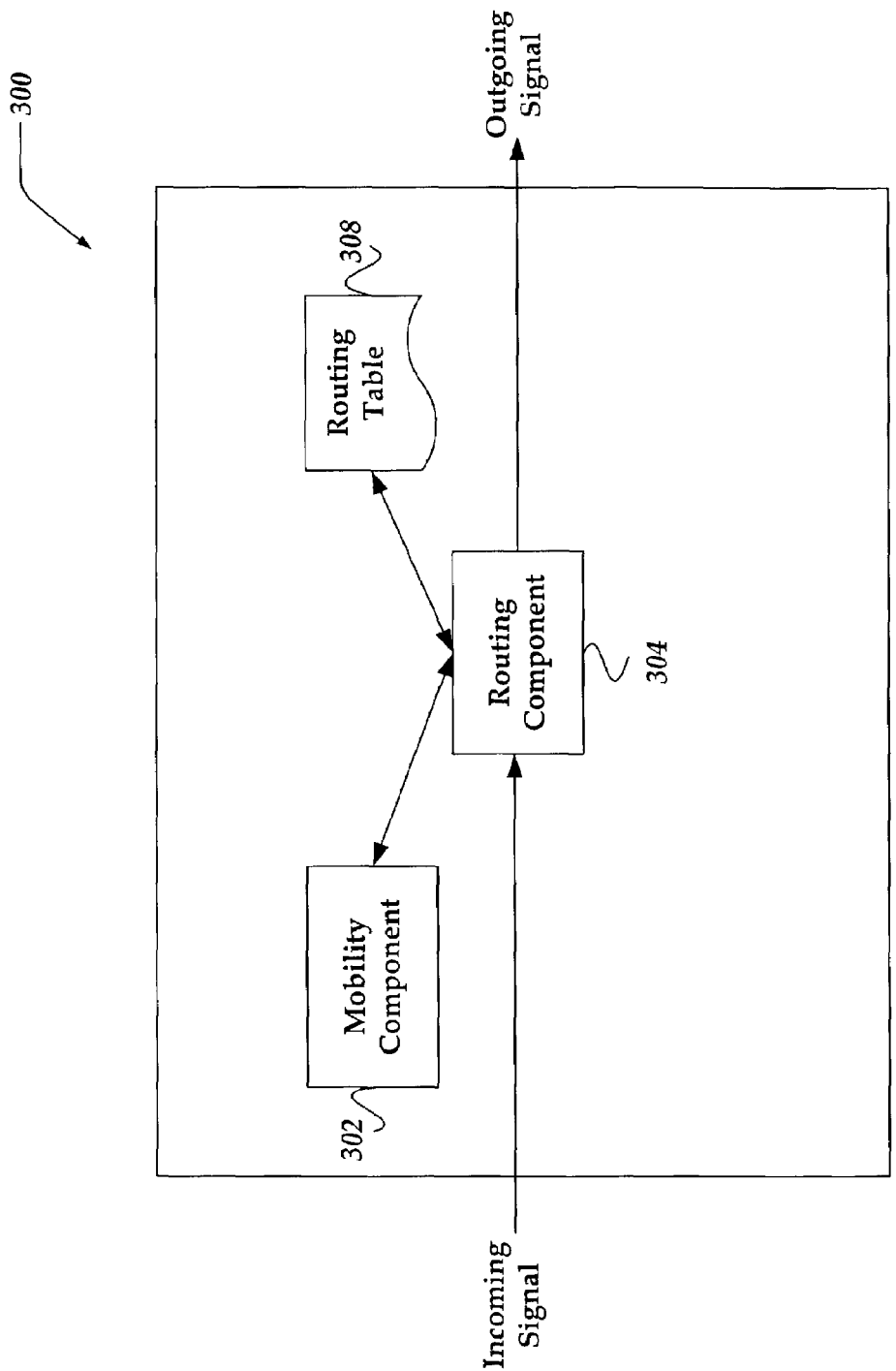
FIG. 3 illustrates a functional block diagram of one embodiment of a mobile router.

FIG. 3 illustrates a functional block diagram of one embodiment of a mobile router shown in FIG. 1. As shown in the figure, mobile router 300 includes mobility component 302, routing component 304, and routing table 308. Mobile router 300 may include many more components than those shown in FIG. 3. However, the components shown are sufficient to disclose an illustrative embodiment for practicing the present invention.

As shown in FIG. 3, mobility component 302 is in communication with routing component 304. Mobility component 302 includes software and related hardware configured to perform router mobility actions such as agent discovery and registration.

Agent discovery includes determination of the presence of agent routers. Agent discovery may include receiving advertisement information such as a number of seconds an agent is considered valid, a care-of-address for a point of attachment, a registration lifetime, and a supported service such as generic routing encapsulation (GRE) information. Agent discovery may also include agent solicitation to request an advertisement from another router, such as a home agent or an access router in a foreign network. Mobility component 302 is also configured to determine if an advertisement received through routing component 304 is from a router on a home network or a foreign network.

Mobility component 302 is also configured to perform registration actions with another router. Registration actions may include sharing of care-of-address information with the other router.

Routing component 304 includes software and related hardware that is configured to perform path determination. Path determination may be based on a variety of criteria to determine a path where there may exist more than one available path to a destination. Any of a number of routing protocols may be employed to determine the path. For example, Routing component 304 may employ a distance vector, a link state, or a hybrid routing protocol, such as Routing Information Protocols (RIP), Interior Gateway Routing Protocol (IGRP), Open Shortest Path First Routing Protocol (OSPF), and Protocol Independent Multicast (PIM). However, the present invention is not so limited, and any other mechanism may be employed to determine the path based on information about the available paths.

The determination of information associated with a link may depend on a number of factors. In one embodiment, the information associated with a link includes a value of one. The information associated with a link may also include a characteristic of the link based on a bandwidth of the link, a capacity of the link, a reliability of the link, a load on the link, a delay of the link, a number of hops along a path, a transmission unit, link quality, weight coefficient, or a similar attribute that enables selection of a path or portion of a path to a destination. In one embodiment, the information is a cost metric determined from a cost associated with each link in the tunnel.

The information may also be manually configured in mobile router 300 as it moves and changes its point of attachment. Moreover, the information may be obtained external to mobile router 300 with the assistance of a policy server, or even by querying a third party server.

Typically, the information is obtained by communicating a request to routing component 304. The request may result in an exchange of information with another router. Routing component 304, in turn employs mobility signaling to communicate a request for information about an available path.

Routing component 304 also is configured to determine information associated with an available path, and to employ the information to determine a path to communicate. To aid in path determination, routing component 304 is configured to initialize and maintain routing table 308. Routing table 308 includes information associated with a path.

Additionally, routing component 306 enables configuration of a tunnel with another router, performs encapsulation and decapsulation of packets.

Routing component 304 within mobile router 300 may exchange information via a mobility signal with another router, such as the home agent 114, in its network. When it is in a foreign network, mobile router 300 can exchange information via a mobility signal with the home agent 114, through a tunnel. In one embodiment, the mobility signal is an IP datagram. The IP datagram includes a field associated with a hop count. Hop count may include a Time to Live (TTL) field in an IPv4 header, a hop limit field in an IPv6 header, or the like. As the IP datagram traverses the path between routers, the hop count field is modified to include information associated with the path. In one embodiment, the hop count field includes information associated with a distance the IP datagram travels. The information associated with the hop count field may enable determination of the length of the tunnel between the mobile router and the home agent.

Routing component 304 may also advertise the information to another router. The other router is enabled to employ the information to determine a path for communication. In one embodiment, the metric information received from router determination component 304 may include at least a portion of routing table 308, which is advertised to the other router.

Generalized Operation

Figure 4:
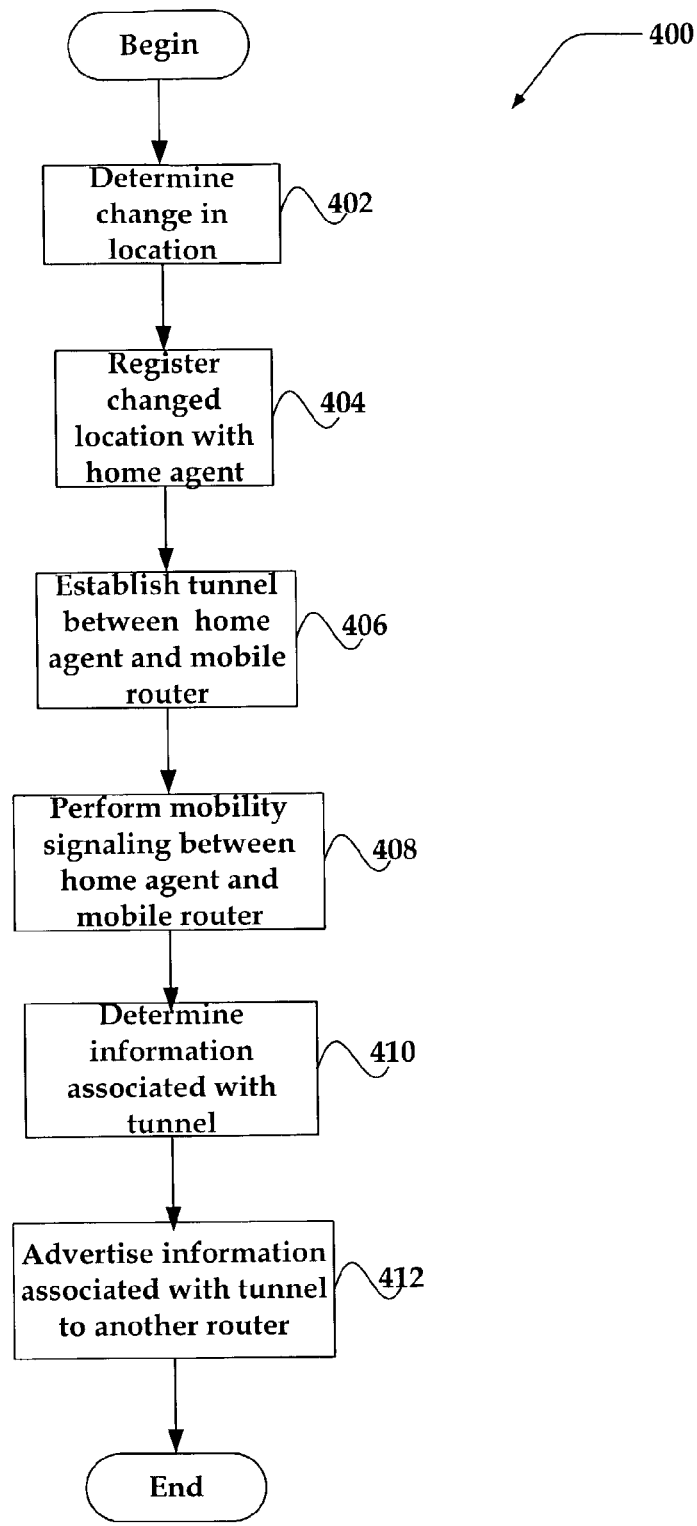
FIG. 4 illustrates a flow diagram generally showing one embodiment of a process for updating information in a mobile network, in accordance with aspects of the invention.

FIG. 4 illustrates a flow diagram generally showing one embodiment of a process for updating information in a mobile network. Process 400 may be employed within mobile system 100 shown in FIGS. 1 and 2.

As shown in FIG. 4, after a start block, the process moves to block 402, where a change in the disposition of a mobile router is detected. Discovery of a changed (new) location typically includes at least one of a home agent and an access router. In one embodiment, home agents and access routers on a foreign network advertise their presence by periodically multicasting or broadcasting advertisement messages. An advertisement may be communicated by employing an Internet Control Message Protocol (ICMP) Router Discovery Protocol (IRDCP). An exemplary advertisement message may include information associated with the number of seconds that the communicating agent or access router is considered valid, a care-of-address from the agent or access router, and information regarding supported services such as generic routing encapsulation (GRE), and the like. In another embodiment, the mobile router sends an agent solicitation message, thereby causing an agent or access router to return an advertisement message.

In any case, the mobile router receives the advertisement message and determines if it is connected to a home network or a foreign network. Upon discovery that the mobile router has moved outside of its home network, the process flow proceeds to block 404 where registration of the new location begins.

At block 404, the mobile router registers its new location with its home agent. Typically, the mobile router is configured with its home address, the address of its home agent, and a mobility security association with its home agent. The mobile router may also include information associated with a shared encryption key for authentication between the home agent and itself. The mobile router employs such information along with other information to communicate a registration request to its home agent, or the access router. In one embodiment, if the mobile router is attached to the foreign network, the registration request is sent to the access router. The access router in turn forwards the registration request to the home agent of the mobile router. Upon successful registration of the mobile router, the process proceeds to block 406, where a tunnel is established for transporting signals to and from the mobile network.

At block 406, the mobile router and home agent establish a tunnel between them. Packets destined for the mobile network arrive at the home agent from the mobile router. The home agent typically performs encapsulation of the packets and tunnels them to the mobile router. The mobile router performs decapsulation of the packets and forwards them to a destination within the mobile network. In either event, the tunnel appears as a virtual encrypted point-to-point connection between the mobile router and the home agent.

In the reverse direction, packets that originate from the mobile network arrive at the mobile router, where the mobile router encapsulates the packets and sends them to the home agent. The home agent decapsulates the packets and forwards them to an intended destination.

Upon establishment of the tunnel, the process flow continues to block 408, where mobility signaling is performed to obtain information about the tunnel. A mobility protocol is employed to exchange mobility signals between the mobile router and home agent. The mobility protocol may be Mobile IP, or a session initiation protocol (SIP) modified with mobility extensions, or any other mechanism for communicating mobility signals between mobile router and home agent through the tunnel. The mobility signal may be sent from the mobile router or from the home agent. In any case, a return mobility signal is exchanged by the end recipient of the mobility signal. The mobility signals include information associated with a characteristic of the tunnel.

Each tunnel router may include information associated with a characteristic of a link in the tunnel. Link characteristics may include information based on a bandwidth of the link, a capacity of the link, a reliability of the link, a load of the link, a delay of the link, a link quality, weigh coefficient, a transmission unit, or a similar attribute that enables selection of a path or portion of a path to a destination. In one embodiment, the characteristic for each link in the tunnel is employed to determine information associated with link. The mobility signal obtains the information associated with the links in the tunnel as it traverses the tunnel, thereby enabling the determination of a cost associated with the tunnel.

In another embodiment, the information associated with the mobility signal represents the number of router hops the mobility signal traverses as it travels the tunnel between the home agent and the mobile router.

The mobility signal may be an explicit signal that is invoked by either the mobile router or its home agent to determine the cost of the tunnel. Moreover, an IP datagram may be employed that is exchanged either as the tunnel is configured, or after the tunnel has been configured. The IP datagram may include information associated with a hop count. The hop count may be included in the Time to Live (TTL) field associated with a header in an IP datagram. The hop count may also be included in a hop limit field in an IPv6 header of the IP datagram. Hop count information may indicate the number of router hops the IP datagram takes as it traverses the tunnel.

In yet another embodiment, the information is manually configured as the mobile router moves and changes its point of attachment. Cost of the tunnel may then be obtained from the manually configured information.

The present invention is not limited to mobility signaling to obtain information about the tunnel, however. For example, information about the tunnel may also be obtained by employing extensions to routing protocols.

Moving from block 408, the process flows to block 410, where the information is employed to determine a cost associated with the tunnel. The information associated with the cost of the tunnel typically is employed to update routing tables. The home agent typically updates its routing tables employing any of a number of routing protocols, such as a distance vector, a link state, and a hybrid routing protocol, such as Routing Information Protocols (RIP), Interior Gateway Routing Protocol (IGRP), Open Shortest Path First Routing Protocol (OSPF), and Protocol Independent Multicast (PIM), or any other routing mechanism. Moreover, determination of the information associated with the tunnel may not be performed by the home agent. For example, the mobile router or another router that receives the mobility signals may determine the information associated with the tunnel.

Next, the process flow proceeds to block 412, where the information associated with the tunnel is advertised to another router. The information may be communicated employing any of a number of routing protocols. The information may be communicated during a periodic routing update advertisement or an explicit routing update advertisement may be triggered to propagate the information associated with the tunnel. If another router receives the information, the other router is enabled to determine a path based on the information associated with the tunnel. Next, the process moves to an end block and returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for updating information in a mobile network, comprising:
   determining at least one characteristic for each link in a plurality of links in a tunnel between a home agent router and a mobile router, wherein a node resides between two links in the plurality of links within the tunnel;
   determining information associated with the tunnel, wherein the information is a function of the at least one characteristic for each link within the tunnel;
   advertising the information to another router; and
   enabling the other router to employ the information associated with the tunnel to determine a path for communication.

2. The method of claim 1, wherein determining information further comprises:
   exchanging a signal between the router and the mobile router through the tunnel, wherein the signal includes the information; and
   modifying the information as the signal traverses the tunnel.

3. The method of claim 2, wherein the signal is an IP datagram.

4. The method of claim 3, further comprises associating a hop count with a field in the IP datagram, wherein the hop count includes the information associated with the tunnel.

5. The method of claim 1, wherein determining a characteristic for each link further comprises determining at least one of a capacity, bandwidth, reliability, load, delay, hop count, link quality, weight coefficient, and transmission unit.

6. The method of claim 1, wherein advertising the information further comprises:
configuring a table to include the information associated with the tunnel; and
sending at least a portion of the table to the other router.

7. The method of claim 6, wherein configuring the table further comprises using a routing protocol selected from one of a distance vector, link state, and hybrid routing protocol.

8. The method of claim 1, wherein the information further comprises including a sum of a numeric characteristic for each link in the tunnel.

9. The method of claim 1, wherein the other router resides in at least one of a mobile network, and a home network.

10. The method of claim 1, wherein determining information associated with the tunnel further comprises exchanging a message using a mobility protocol selected from one of a mobile IP protocol, and a session initiation protocol.

11. The method of claim 1, wherein the tunnel is an encrypted point-to-point connection.

12. The method of claim 1, wherein the information further comprises a metric associated with a cost of the tunnel.

13. An apparatus for updating information in a mobile network, comprising:
(a) a network interface that employs a packet-based protocol to send and receive packets through a tunnel; and
(b) a router for advertising the information associated with the tunnel, wherein the router performs actions, including:
determining at least one characteristic for each link in a plurality of links in a tunnel between the router and a mobile router, wherein a tunnel router resides between two links in the plurality of links within the tunnel;
determining information associated with the tunnel, wherein the information is a function of the at least one characteristic for each link associated within the tunnel;
advertising the information to another router, wherein the advertised information enables the other router to employ the information associated with the tunnel to determine a path for communication.

14. The apparatus of claim 13, wherein determining the information further comprises:
exchanging a signal between the router and the mobile router through the tunnel, wherein the signal includes the information; and
modifying the information as the signal traverses the tunnel.

15. The apparatus of claim 14, wherein the signal is an IP datagram.

16. The apparatus of claim 15, further comprises associating a hop count with a field in the IP datagram, wherein the hop count includes the information associated with the tunnel.

17. The apparatus of claim 13, wherein determining at least one characteristic for each link in the tunnel further comprises determining at least one of a capacity, bandwidth, reliability, load, delay, hop count, link quality, weight coefficient, and transmission unit.

18. The apparatus of claim 13, wherein advertising the information further comprises:
configuring a table to include the information associated with the tunnel; and
sending at least a portion of the table to the other router.

19. The apparatus of claim 18, wherein configuring the table further comprises using a routing protocol selected from one of a distance vector, link state, and hybrid.

20. The apparatus of claim 13, wherein the information further comprises including a sum of a numeric characteristic for each link in the tunnel.

21. The apparatus of claim 13, wherein the router is at least one of an access router, and a home agent.

22. The apparatus of claim 13, wherein the other router resides in at least one of a mobile network, and a home network.

23. The apparatus of claim 13, wherein determining the information further comprises exchanging a message using a mobility protocol selected from one of a mobile IP protocol, and a session initiation protocol.

24. The apparatus of claim 13, wherein the tunnel is an encrypted point-to-point connection between the mobile router and the router.

25. The apparatus of claim 13, wherein the information further comprises a metric associated with a cost of the tunnel.

26. A system for updating information in a mobile network, comprising:
a mobile router;
a tunnel that is coupled at one end to the mobile router, wherein the tunnel comprises a plurality of links and at least one node, the node being in communication with the mobile router through at least one link;
a router that is coupled to another end of the tunnel, the at least one node being in communication with the router through at least one other link in the plurality of links, the router being configured to perform actions, including:
determining at least one characteristic for each link in the tunnel between the router and the mobile router;
determining information associated with the tunnel, wherein the information is a function of the at least one characteristic for each link within the tunnel;
advertising the information to another router, wherein the information enables the other router to employ the information associated with the tunnel to determine a path for communication.

27. The system of claim 26, wherein determining information further comprises:
exchanging a signal between the router and the mobile router through the tunnel, wherein the signal includes the information; and
modifying the information as the signal traverses the tunnel.

28. The system of claim 27, wherein the signal is a mobility signal.

29. The system of claim 27, wherein the signal further comprises an IP datagram.

30. The system of claim 29, further comprises a hop count that is associated with a field in the IP datagram, wherein the hop count includes the information associated with the tunnel.

31. The system of claim 26, wherein determining at least one characteristic for each link in the tunnel further comprises determining at least one of a capacity, bandwidth, reliability, load, delay, hop count, link quality, weight coefficient, and transmission unit.

32. The system of claim 26, wherein advertising the information further comprises:
configuring a table to include the information associated with the tunnel; and
sending at least a portion of the table to the other router.

33. The system of claim 32, wherein configuring the table further comprises using a routing protocol selected from one of a distance vector, link state, and hybrid.

34. The system of claim 26, wherein the information includes a sum of a numeric characteristic for each link in the tunnel, wherein each numeric characteristic indicates a router hop.

35. The system of claim 26, wherein the router is at least one of an access router, and a home agent.

36. The system of claim 26, wherein the other router resides in at least one of a mobile network, and a home network.

37. The system of claim 26, wherein determining the information further comprises exchanging a message between the mobile router and the router using a mobility protocol selected from one of a mobile IP protocol, and a session initiation protocol.

38. The system of claim 26, wherein determining the information further comprises determining the information from a server.

39. The system of claim 26, wherein determining the information further comprises configuring the mobile routing with the information associated with the tunnel.

40. The system of claim 26, wherein determining the information further comprises configuring the router with the information associated with the tunnel.

41. The system of claim 26, wherein the information further comprises a metric associated with a cost of the tunnel.

42. A method for updating information in a mobile network, comprising:
- determining at least one characteristic for each link in a plurality of links in a tunnel between a home agent router and a mobile router, wherein a node resides between two links in the plurality of links within the tunnel;
- exchanging a mobility signal between the router and the mobile router through the tunnel, wherein the signal enables an acquisition of information associated with each link within the tunnel;
- modifying the information as the signal traverses the tunnel, wherein the information is modified based, at least, in part on the at least one characteristic for each link within the tunnel;
- advertising the information to another router; and
- enabling the other router to employ the information associated with the tunnel to determine a path for communication.

43. The method of claim 1, wherein a number of nodes within the tunnel is enabled to change as the mobile router moves.

* * * * *

UNITED STATES PATENT AND TRADEMARK OFFICE
CERTIFICATE OF CORRECTION

| | | |
|---|---|---|
| PATENT NO. | : 7,035,940 B2 | Page 1 of 1 |
| APPLICATION NO. | : 10/290031 | |
| DATED | : April 25, 2006 | |
| INVENTOR(S) | : Meghana Sahasrabudhe et al. | |

It is certified that error appears in the above-identified patent and that said Letters Patent is hereby corrected as shown below:

In the Title Page:

First Page Col. 2 (U.S. Patent Documents), Line 4, After "4/002" delete "La Porta" and insert -- La Porta et al. --.

Title Page Col. 2 (U.S. Patent Docuements), Line 9, After "12/2002" delete "Higirahim et al." and insert -- Hagirahim et al. --.

Signed and Sealed this

Fifteenth Day of August, 2006

JON W. DUDAS
*Director of the United States Patent and Trademark Office*